United States Patent
Tippman et al.

(10) Patent No.: US 9,723,950 B2
(45) Date of Patent: Aug. 8, 2017

(54) VERTICAL FOOD CABINET

(71) Applicant: Thermodyne Foodservice Products, Inc., Fort Wayne, IN (US)

(72) Inventors: Tim P. Tippman, New Haven, IN (US); Barry L. Tippmann, New Haven, IN (US)

(*) Notice: Subject to any disclaimer, the term of this patent is extended or adjusted under 35 U.S.C. 154(b) by 388 days.

(21) Appl. No.: 14/207,044

(22) Filed: Mar. 12, 2014

(65) Prior Publication Data

US 2014/0272063 A1    Sep. 18, 2014

Related U.S. Application Data

(60) Provisional application No. 61/778,719, filed on Mar. 13, 2013.

(51) Int. Cl.
*A47J 36/24* (2006.01)
*A47J 39/00* (2006.01)

(52) U.S. Cl.
CPC .............. *A47J 36/24* (2013.01); *A47J 39/006* (2013.01)

(58) Field of Classification Search
CPC ................................ A47J 36/24; A47J 39/005
USPC ..................... 165/26, 11.1, 12, 48.1
See application file for complete search history.

(56) References Cited

U.S. PATENT DOCUMENTS

| | | | | |
|---|---|---|---|---|
| 2,690,002 A | * | 9/1954 | Grenell | B21D 53/045 165/170 |
| 3,376,806 A | * | 4/1968 | Magnusson | A47J 37/1214 99/404 |
| 4,210,675 A | * | 7/1980 | Liebermann | A47J 39/006 165/919 |
| 4,224,862 A | * | 9/1980 | Liebermann | A47J 39/006 99/331 |
| 4,278,697 A | * | 7/1981 | Liebermann | A47J 39/006 34/198 |
| 5,086,693 A | | 2/1992 | Tippmann et al. | |
| 5,201,364 A | | 4/1993 | Tippmann et al. | |
| 5,404,935 A | | 4/1995 | Liebermann | |
| 5,715,745 A | * | 2/1998 | Blanton, Jr. | A47J 39/006 126/20 |
| 5,921,096 A | * | 7/1999 | Warren | F25D 15/00 62/185 |
| 5,939,125 A | * | 8/1999 | Tippmann | A47F 10/06 165/171 |
| 2010/0186605 A1 | * | 7/2010 | Lichte | A47J 39/003 99/470 |
| 2012/0216987 A1 | * | 8/2012 | Hartsfield, Jr. | A47F 10/06 165/63 |

* cited by examiner

*Primary Examiner* — Steven Leff
(74) *Attorney, Agent, or Firm* — Taylor IP, P.C.

(57) ABSTRACT

A food cabinet is provided that includes an enclosure with an access door, shelves carried by and vertically arranged within the enclosure, and a heat transfer arrangement. The heat transfer arrangement includes a pump, fluid conduits coupled with the pump and associated with the shelves of the enclosure, a primary tank, and an auxiliary tank. The primary tank is fluidly connected to the pump and contains a heat transfer medium. The auxiliary tank is coupled with the primary tank and provides make-up heat transfer medium to the primary tank. Also provided is a method of warming food using such a food cabinet that includes the steps of placing a food item on one of the shelves, heating the heat transfer medium to a temperature between 200° F. and 250° F., and pumping the heat transfer medium through the shelf.

20 Claims, 3 Drawing Sheets

VERTICAL FOOD CABINET

CROSS REFERENCE TO RELATED APPLICATIONS

This is a non-provisional application based upon U.S. provisional patent application Ser. No. 61/778,719, entitled "VERTICAL FOOD CABINET", filed Mar. 13, 2013, which is incorporated herein by reference.

BACKGROUND OF THE INVENTION

1. Field of the Invention

The present invention relates to vertical food cabinets.

2. Description of the Related Art

The U.S. Department of Agriculture has long determined that there is considerable danger of spoilage and salmonella (food poisoning bacteria) development in food which is held for even short periods of time at temperatures ranging between 40° F. and 145° F. Prior art apparatus utilizing, e.g., electrically heated air, steam, etc. have encountered problems in attempting to maintain warm food articles held in the apparatus at temperatures above 140° F. within a temperature range of ±5° F. without also causing considerable undesired additional cooking or "overcooking" of the food.

A vertical food cabinet is used to heat and store food at an elevated temperature which prevents bacteria growth, while at the same time preventing overcooking of the food. In general, known vertical food cabinets store cooked meat or other food articles in an enclosure intended to be repeatedly and frequently opened and closed, supporting the cooked food on shelves located within the enclosure, forcing a heated liquid heat-transferring medium through a manifold located adjacent to each shelf, and maintaining the humidity within the enclosure above that of the atmosphere outside of the chamber and the temperature above 140° F. and within a temperature range of ±5° F. Examples of vertical food cabinets are disclosed in U.S. Pat. No. 5,404,935 (Liebermann); U.S. Pat. No. 5,086,693 (Tippmann et al.) and U.S. Pat. No. 5,201,364 (Tippmann et al.), each of which are assigned to the assignee of the present invention and incorporated herein by reference. Such a vertical food cabinet is known in the industry as a "Thermodyne", which is a federally registered trademark owned by the assignee of the present invention. A Thermodyne maintains food at a temperature between 140° F. and 200° F. and within a temperature range of ±1 to 5° F., while at the same time not overcooking the food.

What is needed in the art is a vertical food cabinet that is capable of maintaining food at a temperature above 200° F., while at the same time not overcooking the food.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DESCRIPTION OF THE INVENTION

Figure 1:
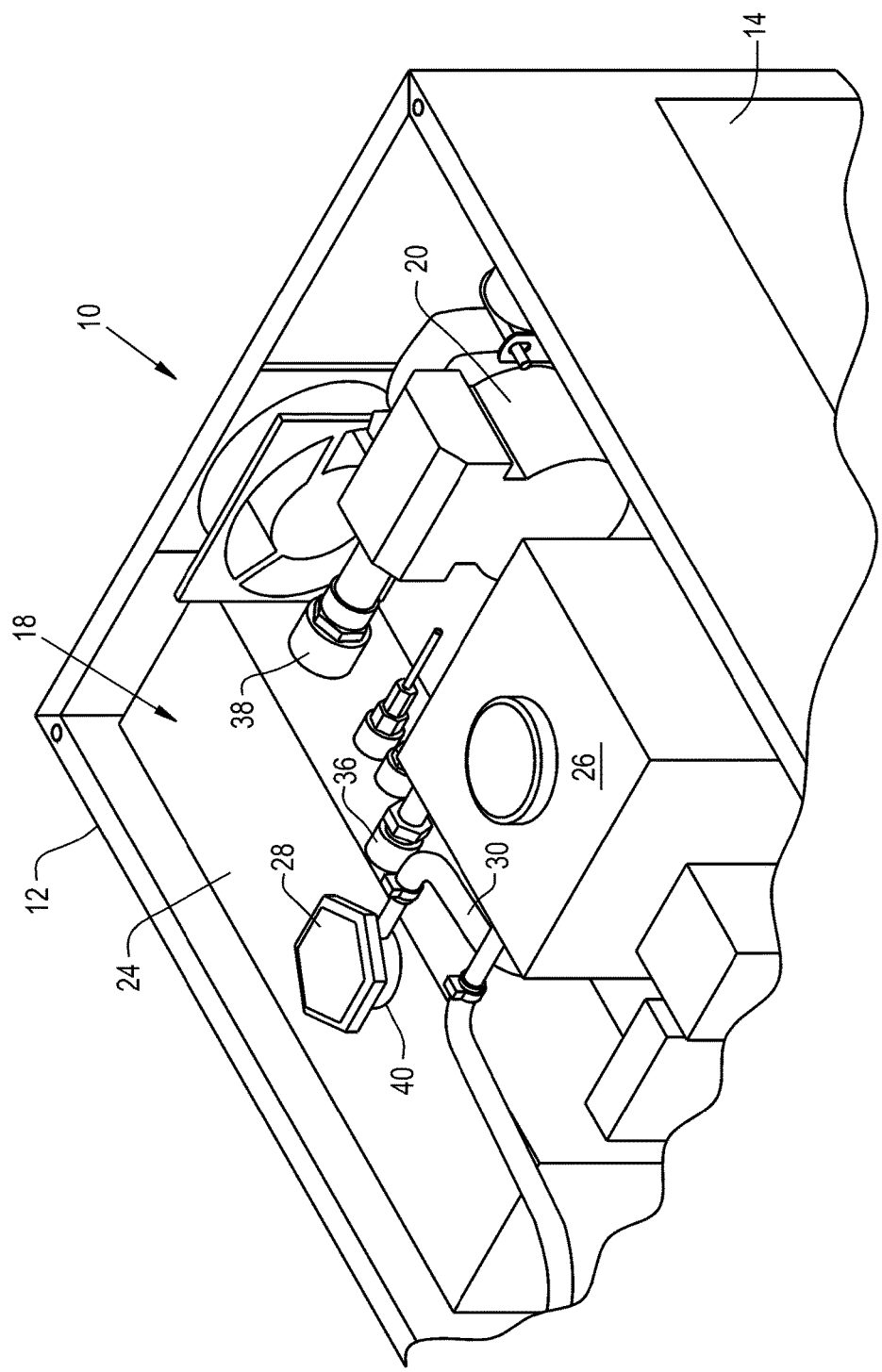
FIG. 1 is a top perspective view of an embodiment of a vertical food cabinet of the present invention.

Referring now to the drawings, there is shown an embodiment of a vertical food cabinet 10 which generally includes an enclosure 12 with an access door 14, a plurality of shelves 16 carried by and vertically arranged within enclosure 12, and a heat transfer arrangement 18. The general construction and principles of operation of vertical food cabinet 10 are known in the art, such as shown and described in U.S. Pat. No. 5,086,693 (Tippmann et al.) and U.S. Pat. No. 5,201,364 (Tippmann et al.), and will not be described in detail herein for the purposes of brevity.

According to an aspect of the present invention, heat transfer arrangement 18 includes a pump 20, supply and return manifolds 21, a plurality of fluid conduits 22, a primary tank 24 and an auxiliary tank 26. Fluid conduits 22 are coupled with pump 20 and are respectively associated with the plurality of shelves 16. In the illustrated embodiment, each shelf 16 is made from metal and includes a predetermined configuration and number of internal passageways or conduits allowing a heat transfer medium, such as a water/glycol mixture, to be circulated therethrough. Fluid conduits 22 are coupled in parallel with pump 20, thereby maintaining a substantially constant temperature from one shelf to another.

Primary tank 24 includes a pressure release valve, which is preferably configured as a radiator-type cap 28. Cap 28 functions to allow an overflow of the heat transfer medium from primary tank 24 to auxiliary tank 26 upon heating of the heat transfer medium, and also allows make-up heat transfer medium to flow back to primary tank 24 from auxiliary tank 26 upon cooling of the heat transfer medium.

More particularly, when the heat transfer medium heats up, it expands, causing the pressure to build up. Cap 28 is the only place where this pressure can escape, so the setting of the spring on the cap determines the maximum pressure in the heat transfer system. When the pressure reaches a predetermined pressure value, such as 15 psi, the pressure pushes the valve open, allowing the heat transfer medium to flow from primary tank 24 to auxiliary tank 26. The heat transfer medium flows through tube 30 into auxiliary tank 26. This arrangement keeps air out of the system. When the heat transfer medium cools down, a vacuum is created in the system that pulls open another spring loaded valve, which can be part of the cap 28, sucking heat transfer medium back in from auxiliary tank 26 to primary tank 24 through tube 30 to replace the heat transfer medium that was expelled.

Figure 2:
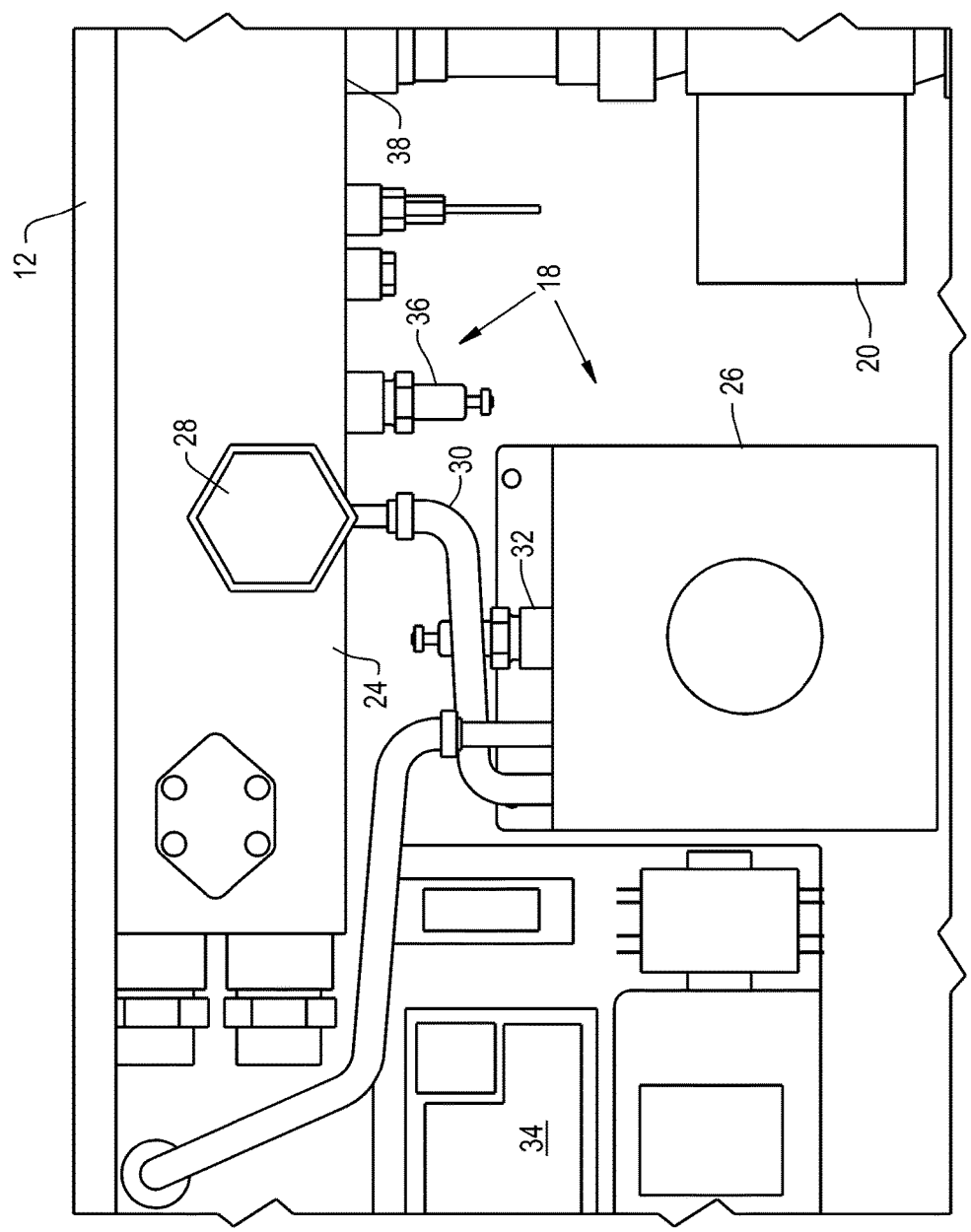
FIG. 2 is a top view of the vertical food cabinet shown in FIG. 1.
Figure 3:
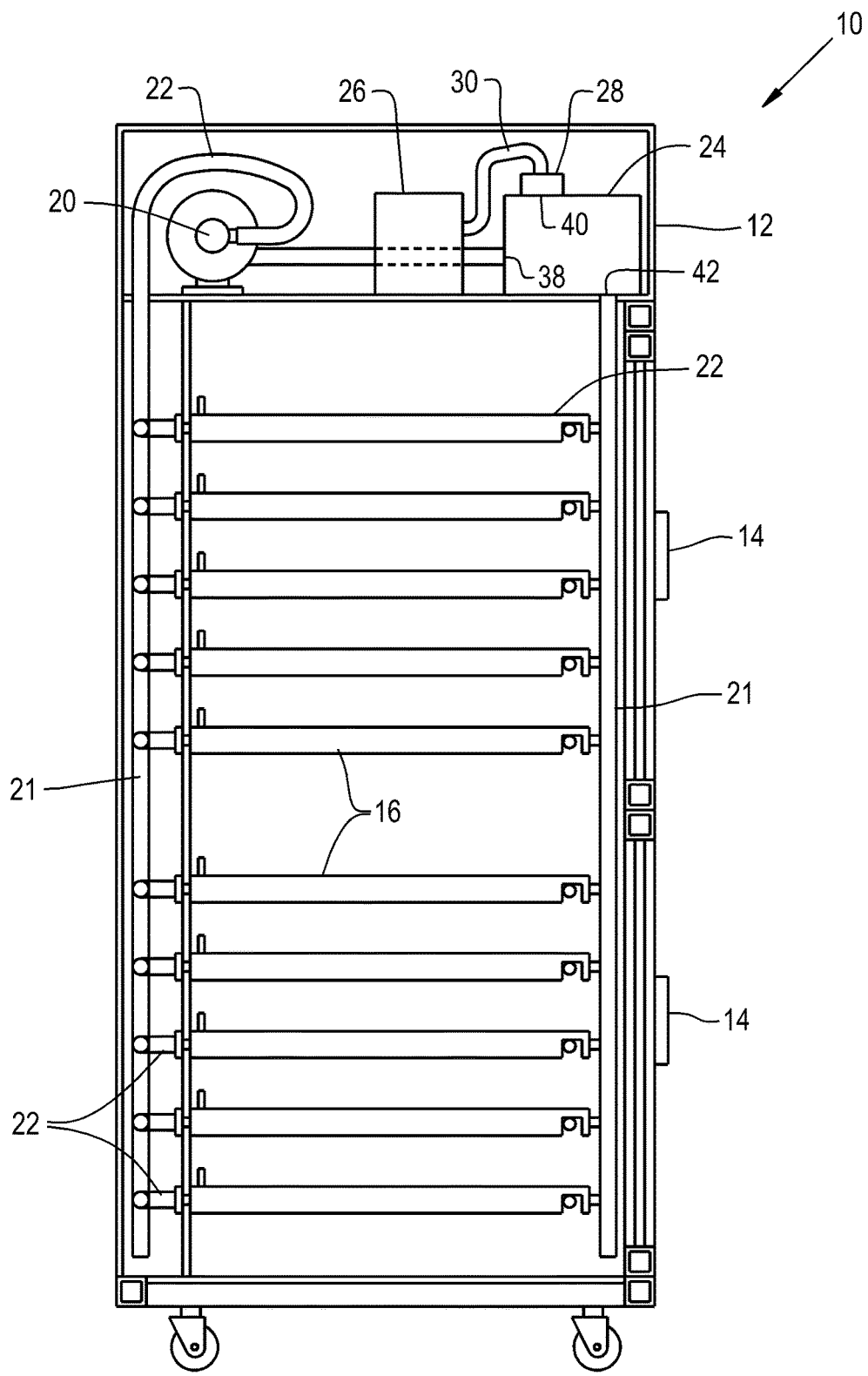
FIG. 3 is a side cut-away, partially schematic view of the vertical food cabinet shown in FIGS. 1-2.

From the foregoing, it should be appreciated that the heat transfer arrangement 18 formed according to the present invention defines a closed fluid flow system for flow of the heat transfer medium throughout. Referring to FIGS. 1-3, it can be seen that the primary tank 24 can have an outlet port 38 coupled with the pump 20 to provide heat transfer medium from the primary tank 24 to the fluid conduits 22 associated with the shelves 16. The primary tank 24 can also have an inlet/outlet port 40 which is in a parallel flow relationship with the outlet port 38 and is coupled to the auxiliary tank 26 so as to allow fluid flow both into the primary tank 24 from the auxiliary tank 26 and out of the primary tank 24 into the auxiliary tank 26. The radiator cap 28 can be between the inlet/outlet port 40 and the auxiliary tank 26 so a pressure-activated relief valve inside the cap 28 allows heat transfer fluid flow into the auxiliary tank 26 from the primary tank 24 upon pressure in the primary tank 24 reaching the predetermined pressure value and so a pressure-activated vacuum relief valve inside the cap 28 allows heat transfer fluid flow into the primary tank 24 from the auxiliary tank 26 upon pressure in the primary tank 24 falling below the predetermined pressure value. After heat transfer fluid has flowed through the fluid conduits 22 associated with the shelves 16, the heat transfer fluid can return to an inlet port 42 of the primary tank 24 via a return manifold 21 for re-heating and recirculation through the closed fluid flow system of the heat transfer arrangement 18.

In contrast with known designs for vertical food cabinets, the pressure within the heat transfer arrangement 18 of the present invention operates at a pressure which is above atmospheric pressure, preferably 10 to 20 PSI above atmospheric pressure, and more preferably approximately 15 to 16 PSI above atmospheric pressure. With an increased pressure, it is also possible to increase the operating temperature of the heat transfer medium within heat transfer arrangement 18. The heat transfer medium within heat transfer arrangement 18 operates at a temperature of between 200° F. and 250° F., preferably between 200° F. and 230° F., and more preferably approximately 230° F. This increased operating temperature in turn provides increased efficiency and greater flexibility over conventional designs. The food may be cooked faster at temperatures above 200° F., and then the temperature reduced to a desired holding temperature typically between 140-180° F.

Auxiliary tank 26 includes a fluid level sensor 32 which provides an output signal to a controller 34 indicative of a low fluid level in auxiliary tank 26. The output signal from fluid level sensor 32 can be used, e.g., to actuate a display and provide a user with an indication of a low fluid level within auxiliary tank 26. The user may then replenish the heat transfer medium within auxiliary tank 26.

Similarly, primary tank 24 includes a fluid level sensor 36 which provides an output signal to controller 34 indicative of a low fluid level in primary tank 24. The output signal from fluid level sensor 36 can be used, e.g., in an automatic shutdown operation of vertical food cabinet 10 when the heat transfer medium has reached a minimum threshold level.

Vertical food cabinet 10 of the present invention ensures that primary tank 24 remains full at all times (unless there is a problem, sensed by fluid level sensors 32 and/or 36). The heater element(s) within primary tank 24 thus remain covered with the heat transfer medium at all times, thereby preventing burnout of the heater elements. In a marine application, the fluid within a partially full tank would slosh around and potentially allow exposure and burnout of the heater elements. Since the primary tank 24 is maintained full of heat transfer medium, vertical food cabinet 10 of the present invention may be used in marine applications.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A food cabinet, comprising:
   an enclosure with an access door;
   a plurality of shelves carried by and vertically arranged within said enclosure; and
   a heat transfer arrangement defining a closed fluid flow system and including:
   a pump;
   a plurality of fluid conduits coupled with said pump and respectively associated with said plurality of shelves;
   a primary tank fluidly connected to said pump and containing a heat transfer medium, said primary tank including an inlet port which allows heat transfer medium to flow into said primary tank, an outlet port which allows heat transfer medium to flow out of said primary tank, and an inlet/outlet port in a parallel flow relationship with said outlet port which allows heat transfer medium to flow both into and out of said primary tank, said pump being configured to pump said heat transfer medium through said plurality of fluid conduits;
   an auxiliary tank coupled with said inlet/outlet port of said primary tank and providing make-up heat transfer medium to said primary tank; and
   at least one pressure-activated valve between said inlet/outlet port of said primary tank and said auxiliary tank, said at least one pressure-activated valve being configured to maintain a temperature of heat transfer medium in said primary tank between 200° F. and 250° F.

2. The food cabinet of claim 1, wherein said primary tank includes a radiator-type cap including said at least one pressure-activated valve.

3. The food cabinet of claim 2, wherein said auxiliary tank acts as an overflow tank upon heating of said heat transfer medium, and provides make-up heat transfer medium to said primary tank upon cooling of said heat transfer medium.

4. The food cabinet of claim 1, wherein said heat transfer arrangement is capable of heating said heat transfer medium to a temperature of between 200° F. and 250° F.

5. The food cabinet of claim 4, wherein said heat transfer arrangement is capable of heating said heat transfer medium to a temperature of between 200° F. and 230° F.

6. The food cabinet of claim 4, wherein said heat transfer arrangement is capable of heating said heat transfer medium to a temperature of approximately 230° F.

7. The food cabinet of claim 1, wherein said auxiliary tank includes a fluid level sensor providing an output signal indicative of a low fluid level in said auxiliary tank, said output signal providing an indication to a user of a low fluid level.

8. The food cabinet of claim 1, wherein said primary tank includes a fluid level sensor providing an output signal indicative of a low fluid level in said primary tank, said output signal being used in an automatic shut-off of said vertical food cabinet in the event of a low fluid level in said primary tank.

9. The food cabinet of claim 8, wherein said primary tank includes at least one heater element.

10. The food cabinet of claim 9, wherein said low fluid level corresponds to a condition when said at least one heater element is not completely submerged in fluid.

11. The food cabinet of claim 9, wherein said low fluid level corresponds to a condition when said at least one heater element is not submerged in fluid.

12. The food cabinet of claim 1, wherein said at least one pressure-activated valve includes a pressure release valve and a vacuum relief valve.

13. The food cabinet of claim 1, wherein said at least one pressure-activated valve is configured to keep a pressure within said primary tank within a range of about 10 to 20 PSI above atmospheric pressure.

14. The food cabinet of claim 1, wherein said outlet port is fluidly connected to said pump and said inlet/outlet port is fluidly connected to said auxiliary tank.

15. A method of warming a food item, the method comprising the steps of:
    providing a food cabinet including:
        an enclosure with an access door;
        a plurality of shelves carried by and vertically arranged within said enclosure; and
        a heat transfer arrangement defining a closed fluid flow system and including:
            a pump;
            a plurality of fluid conduits coupled with said pump and respectively associated with said plurality of shelves;
            a primary tank fluidly connected to said pump and containing a heat transfer medium, said primary tank including an inlet port which allows heat transfer medium to flow into said primary tank, an outlet port which allows heat transfer medium to flow out of said primary tank, and an inlet/outlet port in a parallel flow relationship with said outlet port which allows heat transfer medium to flow both into and out of said primary tank, said pump being configured to pump said heat transfer medium through said plurality of fluid conduits;
            an auxiliary tank coupled with said inlet/outlet port of said primary tank and providing make-up heat transfer medium to said primary tank; and
            at least one pressure-activated valve between said inlet/outlet port of said primary tank and said auxiliary tank;
    placing said food item on one of said plurality of shelves;
    heating said heat transfer medium to a temperature between 200° F. and 250° F., said at least one pressure-activated valve being configured to maintain said temperature of said heat transfer medium between 200° F. and 250° F. during heating; and
    pumping said heat transfer medium through at least part of said heat transfer arrangement and said one of said plurality of shelves.

16. The method of claim 15, further comprising the step of maintaining a system pressure within at least part of said heat transfer arrangement that is 10 to 20 PSI above atmospheric pressure.

17. The method of claim 16, further comprising the step of maintaining a sufficient fluid level within said primary tank.

18. The method of claim 17, wherein said primary tank includes at least one heater element and said sufficient fluid level is a level of fluid that at least partially covers said at least one heater element with said heat transfer medium.

19. The method of claim 18, wherein said maintaining steps are accomplished by at least one of said heating step, transferring said heat transfer medium from said auxiliary tank to said primary tank and automatically shutting off said food cabinet at a fluid level that is below said sufficient fluid level.

20. The method of claim 19, further comprising the step of lowering the temperature of said heat transfer medium below 200° F. when said food item reaches a cooked temperature.

* * * * *